Dec. 11, 1934. J. D. BOYD 1,983,966
COMBINATION WEIGHT AND HEIGHT MEASURING DEVICE
Filed Feb. 17, 1932   2 Sheets-Sheet 1
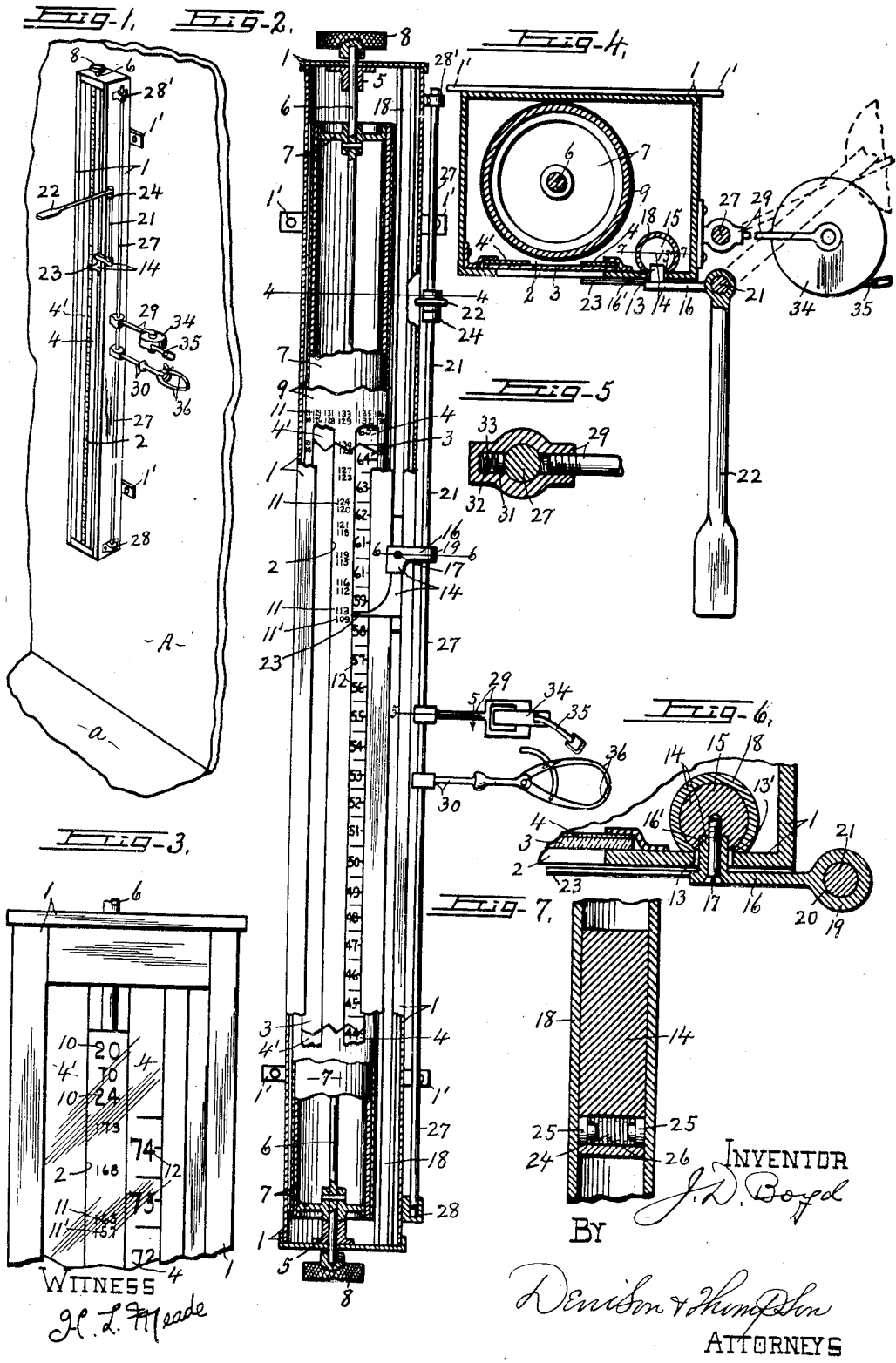
INVENTOR
J. D. Boyd
BY
Denison & Thompson
ATTORNEYS
WITNESS
H. L. Meade Dec. 11, 1934.                    J. D. BOYD                    1,983,966
            COMBINATION WEIGHT AND HEIGHT MEASURING DEVICE
                         Filed Feb. 17, 1932           2 Sheets-Sheet 2

Patented Dec. 11, 1934

1,983,966

UNITED STATES PATENT OFFICE 1,983,966

COMBINATION WEIGHT AND HEIGHT MEASURING DEVICE

John D. Boyd, Chittenango, N. Y.

Application February 17, 1932, Serial No. 593,491

8 Claims. (Cl. 33—169)

This invention relates to an apparatus for determining the theoretical weight of persons according to their actual height and age and is adapted to be used more particularly in schools, gymnasiums and other places where such an apparatus might be useful.

It is well known that medical statisticians have established the fact that any person having a certain height and age should also have an approximately proportionate weight in order to be in the best physical condition, and the main object of the present invention is to provide a simple and efficient apparatus for conveniently establishing the relation between the height, age and weight of any person under test to determine whether or not that person is in the best physical condition according to the pre-established statistics.

In other words, I have sought to combine in a single unit a weight-and-age chart with a height measuring device in such manner that the weight indicating characters will be arranged in vertical columns, each representing a different age, and also in horizontal rows, each representing a different height so that when the height of the person under test is ascertained by means of the measuring device the theoretically correct weight of that person of known age will be readable on the chart at the intersection of the corresponding height line with the given age column.

Another object is to provide the apparatus with means for measuring the girth or diameter of any member of the body of the person under test.

Other objects and uses will be brought out in the following description.

In the drawings:

Figure 1 is a perspective view on a reduced scale of an apparatus embodying the various features of my invention shown as applied to a portion of the wall of a building.

Figure 2 is an enlarged front elevation, partly in section, of the same apparatus.

Figure 3 is a further enlarged front face view of the upper portion of the apparatus.

Figure 4 is an enlarged horizontal sectional view taken in the plane of line 4—4, Figure 2.

Figures 5 and 6 are enlarged detail horizontal sectional views taken respectively in the planes of line 5—5, and 6—6, Figure 2.

Figure 7 is an enlarged detail vertical sectional view taken on line 7—7, Figure 4.

Figure 8 is a face view of the detached weight and age chart and height measuring element.

As illustrated, this apparatus comprises an upright frame 1 having opposite laterally projecting apertured lugs 1' adapted to receive suitable screw or other fastening means by which it may be secured to a wall A or other upright support, said frame being preferably rectangular in cross section and provided in its front side with a relatively narrow sight opening 2 extending the major portion of the vertical length thereof, the opening being normally closed by a transparent plate 3 of glass or equivalent material held in place by suitable flanges 4 and 4' which are secured to the front wall of the frame at opposite sides of the sight opening 3 as shown more clearly in Figures 2 and 4.

The lower and upper end walls of the frame 1 are provided with journal bearings 5 in which is journaled the opposite ends of an upright shaft 6 carrying a drum 7, the lower and upper ends of the shaft being extended beyond the corresponding ends of the frame and provided with knurled hand wheels 8 by which the shaft 6 and drum 7 may be rotated.

This drum 7 is located wholly within the frame or housing 1 to extend the major portion of the height thereof between the lower and upper end walls so that its axis will be approximately in the vertical plane of the longitudinal center of the sight opening 2 while the diameter of the drum will be sufficient to bring its periphery into close proximity to the inner face of the glass plate 3.

A chart 9 of paper or any other suitable material is wrapped around and upon the periphery of the drum 7 to extend the full length thereof and preferably throughout its circumference and may, if desired, be adhesively or otherwise secured thereto to rotate with the drum.

The outer face of this chart 9 is provided, preferably near its upper end, with a horizontal row 10 of age-indicating characters such as numerals gradually increasing in value from one side, preferably the left hand side, toward the opposite side of the chart and arranged in uniformly spaced relation transversely thereof to form the headings of a corresponding number of columns of weight indicating characters, presently described, the age indicating characters representing, in this instance, ages from 7 years to 59 years in yearly sequence except that the numerals indicating the ages from 20 to 59 are arranged in groups of four years each for the reason that the weights under the ages represented in each group varies ony slightly thus permitting the width of the chart and consequently the diameter of the drum to be proportionately reduced although it is evident that the yearly sequence of the numerals may be continued, if desired, by simply making the chart of greater circumferential width and proportionately increasing the diameter of the drum.

The chart 9 is also provided with a multiplicity of rows 11 and 11' of weight indicating characters such as numerals arranged in uniformly spaced relation vertically and gradually increasing in value from the left hand side toward the right hand side of the chart according to certain predetermined heights of the person under test.

These weight indicating numerals are also arranged in vertical columns in vertical alinement with the several age indicating characters and corresponding in value to the age of the person represented by the numeral at the head of the corresponding column and for the height of the person represented by the character on the height scale alined therewith and presently described.

It will be be noted upon reference to Figure 8 that the transverse rows 11 and 11' of weight indicating numerals are grouped more closely together than those of each group, the purpose of which is to represent the weights of males and females, the male weights of each group being uppermost.

Associated with the chart element 9 and its supporting drum 7 is a height indicating element which consists in this instance of the flange 4 having printed upon its front face a vertical column of numerals 12 constituting a height measuring scale in which the numerals gradually increase in value from the bottom upward and preferably represent inches numbered respectively from 38″ at the bottom to 74″ at the top.

The numerals of the scale 12 are uniformly spaced vertically a distance apart corresponding approximately to the several horizontal rows 11 of weight indicating characters. That is, each weight indicating numeral of any one row represents the weight of a person of a certain age in the corresponding column at the corresponding height on the scale 12.

For example, a male person between 38 and 39″ tall at the age of 7 years should be 34# while the female of the same height and age should be 32#. In like manner a male person between 72 and 73″ in height at the age of say 20 to 24 years should weigh 165#, while the female of the same height and age should weigh 157# as indicated on the chart.

In a similar manner, the weight of any person between the heights of 38 and 74″ and between the ages of 7 and 59 years may be readily determined from the weight indicating figures on the chart registering with the height indicating character on the scale 12 and any age indicating character in the row 10.

As a further illustration of the use of the device, assuming that the male person aged 16 is between 60 and 61″ tall, then by following down the column under the age 16 to the horizontal row 11 of age indicating characters registering with the space between the height indicating characters 60 and 61, it will be found that the weight of that person should be 96# or in the female 108#.

The sight opening 2 adjacent the periphery of the chart 9 on the drum 7 is approximately the width of any one of the vertical columns of age indicating characters 10 and underlying weight indicating characters 11 and 11' so as to restrict the visibility of the surface of the chart to one column at a time as the drum with the chart thereon is rotated to bring any one of the columns into registration with the sight opening.

As a further illustration of the operation of the apparatus, assuming that it is desired to ascertain whether or not a person of a certain age and height is of proportionate weight, then the drum with the chart 9 thereon will be rotated to bring the age of that person into registration with the sight opening 2 and then by reading along the chart from the age given, the weight indicating figure corresponding to the height indicating character will be visible through the sight opening to show what the particular weight of that person should be and if this indicated weight is appreciably above or below the actual weight of the individual under test, it shows that his physical condition is abnormal and should be remedied by proper treatment.

It is, therefore, apparent that by the use of this apparatus the physical condition of any person may be readily determined by comparison of the weight indicated on the chart with the actual weight of that person.

In order to further expedite the height measurements, the front wall of the case 1 is provided with a vertical slot 13 extending the major portion of its height for receiving a portion of a vertically movable slide 14 which is preferably composed of an inner relatively short upright cylindrical section 15 and an outer section 16, the latter having a rearwardly projecting boss 16' extending through the opening 13 and secured to the rear section 15 by means of a screw 17 or equivalent fastening means whereby the front section 16 may be removed or replaced when desired without removing the rear section 15.

This rear section 15 is movable vertically in a tubular guide 18 arranged within the frame 1 near the front side thereof and extending from bottom to top of the frame as shown more clearly in Figures 2 and 6.

The front side of the tubular guide 18 is brazed or otherwise permanently secured to the inner face of the front wall of the frame 1 and is provided with a vertical slot 13' in its front side registering with the slot 13 and extending from bottom to top of the tubular guide so as to permit vertical adjustment of the slide 14 throughout the major portion of the height of the frame.

The front section 16 extends laterally beyond the adjacent side of the frame 1 and is provided with an enlarged outer end 19 having a socket 20 for receiving and supporting an upwardly projecting post 21 which carries at its upper end a horizontally projecting head-engaging measuring arm 22 adapted to be swung laterally about the axis of the shaft 21 to and from a position over the head of the person under test so that during the testing operation while the person is standing on the floor or other support, the slide 14 may be moved vertically to bring the arm 22 into engagement with the top of the head of the person under test.

The lower end of the slide 14 is provided with a pointer 23 rigidly secured thereto and extending across the front face of the height measuring scale 12, as shown more clearly in Figures 1, 2, 4 and 6.

As previously stated, the rear end of the height measuring arm 22 is journaled on the upper end of the post 21 to move vertically with the slide 14 as the latter is moved along the scale 12 and is held against downward displacement by means of a collar or shoulder 24 which is rigid with the post 21.

It will be noted upon reference to Figures 1 and 2 that the pointer 23 is arranged some distance below the horizontal plane of the measuring arm 22 and that the numerals on the scale 12 are measured in inches from the platform or floor as a upon which the person under test is adapted to stand, while being measured, so that when the arm 22 is brought into engagement with the top of the head the pointer 23 will register with the numeral on the scale 12 corresponding to the actual height of the person when standing on the platform a, the object in arranging the pointer 23 some distance below the measuring arm 22 being to render the reading of the height of the person on the scale more convenient to the examiner.

That is, when installing the apparatus upon a wall or other support, the numerals of the height measuring scale 12 will be a corresponding number of inches above the platform a and when the measuring arm 22 is brought into engagement with the top of the head of the person under test in an erect position, the pointer 23 will register with the numeral on the scale 12 corresponding to the height of such person and will be in convenient reading position more nearly on the level with the eyes of the examiner, even though the arm 22 may be some distance above the pointer within easy reaching distance of said examiner although it is evident that the person under test may make his own height tests and at the same time be able to read the weight indicating numerals in the row corresponding to his height and in the column corresponding to his age through the sight opening 2.

Suitable means is provided for frictionally holding the slide 14 in any position of adjustment within its tubular guide 18 and for this purpose the lower end of the slide within the guide 18 is provided with a diametrical opening 24 for receiving opposed friction members 25 which are yieldingly held in engagement with the inner walls of the guide 18 by means of a coil spring 26 shown more clearly in Figure 7.

Suitable means is also provided for making measurements of other members of the body and for this purpose an upright rod 27 is supported in suitable bearings 28 and 28' on the lower and upper ends of the frame 1 at one side thereof to extend the major portion of its length as shown more clearly in Figures 1 and 2 for receiving and supporting a pair of brackets 29 and 30 both of which are movable vertically and angularly relatively to said rod and are held in place by friction bearings 31 and a spring 32 both mounted within a socket 33 on the hubs of their respective brackets 29 and 30, as shown more clearly in Figure 5.

The bracket 29 is adapted to receive and support a tape housing 34 and tape 35 of conventional construction capable of winding up the tape and permitting it to be drawn out to suitable lengths for measuring the girth or other parts of the body.

The bracket 30 serves to receive and support a pair of caliper jaws 36 which may be also of conventional construction to permit the measurement of diameters or thicknesses of various members of the body.

Operation

When the apparatus is installed upon a wall or any other upright support, its height indicating numerals on the scale 12 will be arranged corresponding distances above the platform a which may be a floor or the platform of a weighing scales.

Then, when it is desired to determine whether or not the weight of the person under test is proportionate to his height and age, it is simply necessary for the person to stand on the platform a in proximity to the apparatus whereupon the height measuring arm will be adjusted vertically and brought into engagement with the top of the head of that person, thus bringing the pointer 23 into registration with the numeral of the height measuring scale 12 to give the exact height of the person under test.

After the height has been properly determined, the drum 7 will be rotated by one or the other of the hand wheels 8 to register the age of the person under test represented in the horizontal row of numerals 10 on the chart 9 with the sight opening 2, thus bringing the weight indicating numeral of that column alined with the pointer 23 into registration with the sight opening so that the operator may determine at a glance what the weight of that particular person should be for his age and height.

If this indicated weight should be approximately the actual weight of the person under test, it shows that his physical condition is normal, but on the other hand, if there is a wide variation between the weight indicated and the actual weight it shows that the physical condition of the person under test is abnormal and should be remedied by proper treatment.

If other measurements of different portions of the body should be required, they may be effected by the use of the tape 35 or calipers 36, both of which are readily adjustable vertically to different positions and also angularly to render the measuring operations more convenient.

It is, of course, understood that if the slide 14 is moved downwardly to bring its pointer 23 into registration with the lowermost height indicating numeral, in this instance 38, the head engaging member 22 will be 38" above the platform a upon which the person under test is standing and that if the slide is adjusted vertically to any other position to bring its pointer into registration with any one of the other numerals on the height scale 12, the height of the head engaging member 22 would be a corresponding distance above the floor.

On the other hand, if the age and weight should be given, the weight chart may be adjusted rotarily to bring the weight indicating numeral under that particular age into registration with the sight opening, which, by reading from the alined graduation on the height scale, would give the theoretical height of the individual according to that age and weight.

The construction shown and described is particularly simple, practical and efficient but obviously various changes may be made without departing from the spirit of the invention. Furthermore the entire unit may be supported in any desired manner upon or adjacent any type of weighing scale without materially altering its structure.

What I claim is:

1. In an apparatus for determining the theoretical weights of persons according to their height and age, two juxtaposed upright elements having respectively a height-indicating scale and transverse rows of different weight-indicating characters each in line with a different part of the scale, said elements being relatively movable transversely to cause any one of the weight-indicating characters of each row to register with the corresponding part of the scale, and a slide movable along said scale and provided with an offset upwardly projecting post having a head-engaging member on its upper end, said slide having a pointer portion registering both with the height-indicating scale and weight-indicating characters to indicate the desired information.

2. In an apparatus for determining the theoretical weights of persons according to their height and age, two juxtaposed upright elements having respectively a vertical scale of weight indicating characters in vertically spaced relation and a vertical column of height indicating characters arranged in similarly spaced relation, each weight indicating character representing the normal weight of a person for the corresponding height, and a pointer movable along said scale and column for determining the normal weight at that age for any selected height, and a head-engaging member connected to said pointer to move therewith, said pointer and head-engaging member being disposed in different horizontal planes.

3. In an apparatus for determining the theoretical weight of persons according to their age and height, an upright frame having a vertically elongated sight opening in one side, and a cylindrical chart movable about a vertical axis across said opening and provided with a plurality of vertical columns of weight indicating characters arranged in transverse rows, said column representing different ages of the person under test, the several rows representing different heights of persons under test, said chart being provided with a horizontal row of different age-indicating numerals in vertical alinement with the several columns of weight indicating characters and adapted to successively register with the sight opening as the chart is moved, and a slide movable vertically along said scale and provided with a pointer and a head-engaging member in different horizontal planes.

4. In an apparatus for determining the theoretical weight of persons according to their age and height, an upright frame having a sight opening, a height measuring scale at one side of the opening, a cylindrical chart movable about a vertical axis across the opening and provided with a horizontal row of weight-indicating characters adapted to register one at a time with said opening during said movement, each character representing the theoretical weight of a person of given age for the particular height to which the measuring device is set, and a slide movable along said scale and provided with a head-engaging member and a pointer in different horizontal planes, said pointer registering with both the height-measuring scale and weight-indicating characters to give the desired information.

5. In an apparatus for determining the theoretical weight of persons according to their age and height, an upright frame having a sight opening, a height indicating scale of numerals arranged along one side of the opening and gradually increasing in value from the bottom upward, a chart movable about a vertical axis across said opening and provided with a plurality of horizontal rows of weight indicating numerals, those of each row being alined with a corresponding height-indicating character and representing the theoretical weights of persons of different ages for the height indicating numeral with which it is alined, and a slide movable vertically along said scale and provided with a head-engaging member and a pointer in different horizontal planes.

6. In an apparatus for determining the relative weights, heights and ages of persons, an upright frame having a sight opening in one side, a height scale mounted on the frame at one side of the opening and provided with height indicating numerals gradually increasing in value from the bottom upward in combination with a drum rotatable about a vertical axis and having a peripheral chart movable therewith and provided with a multiplicity of rows of weight indicating characters arranged in horizontal alinement with the numerals on the scale, said weight indicating numerals being adapted to successively register with the sight opening as the drum with the chart thereon is rotated, and a slide movable along the scale and provided with a pointer and a head-engaging member in different horizontal planes.

7. In an apparatus for determining the relative weight, ages and heights of persons, an upright frame having a vertically elongated sight opening, a height measuring scale mounted on the frame at one side of the opening and provided with vertically spaced numerals gradually increasing in value from the bottom upward in combination with a drum rotatable about a vertical axis and provided with a peripheral chart having a plurality of vertical columns of weight indicating numerals arranged in transverse rows one above the other in alinement with the corresponding numerals on the height measuring scale and gradually increasing in value from the bottom upward, the chart being also provided with a horizontal row of age indicating numerals in vertical alinement with the columns of weight indicating numerals, said rows of weight indicating numerals and age indicating numerals being adapted to successively register with the sight opening as the drum with the chart thereon is rotated, a vertical guide mounted on the frame, a slide movable along the guide and provided with a pointer movable along the height measuring scale, said slide having a head-engaging arm mounted thereon in a plane above the pointer for movement therewith.

8. In a measuring device of the character described, an upright housing having a front wall and lower and upper end walls, said front wall having a sight opening and a vertical guide slot both extending the greater portion of the distance between the end walls, a cylindrical drum extending the major portion of the length of the housing and having its lower and upper ends journaled in said end walls, said drum having a peripheral chart extending the major portion of the length thereof and provided with vertical columns of weight indicating characters arranged in uniformly spaced relation circumferentially and gradually increasing in value from the lower end upwardly, a vertical scale of height indicating characters at one side of and parallel with the sight opening and gradually increasing in value from the bottom upwardly, a vertical guide tube extending from bottom to top of and within said housing and provided with a guide slot in its front side registering with the first guide slot, a slide movable vertically in said guide slots and having a cylindrical portion movable vertically in the guide tube, a pointer on the slide movable therewith along said scale and registering with both the height-indicating scale and weight-indicating characters, a post mounted on the slide to extend upwardly therefrom at the exterior of the housing parallel with the guide slots, and a head-engaging arm mounted on the upper end of the post in a plane above the pointer.

JOHN D. BOYD.